United States Patent [19]
Francis, deceased

[11] 3,820,745
[45] June 28, 1974

[54] AIRCRAFT

[76] Inventor: Robert Hugh Francis, deceased, 7 St. Michael's Rd., late of Farnborough, England Lillian Lloyd Francis, executrix

[22] Filed: May 19, 1972

[21] Appl. No.: 255,101

[30] Foreign Application Priority Data
May 20, 1971  Great Britain.................... 16101/71

[52] U.S. Cl. ............ 244/40 R, 60/39.82 P, 244/52, 244/130
[51] Int. Cl. .............................................. B64c 21/00
[58] Field of Search........ 244/40 R, 40 A, 1 R, 1 N, 244/1 SB, 42 R, 42 A, 42 C, 52, 73 R, 74, 130, 135 R, 136, 3.21, 3.22; 60/39.82 P, 258, 260; 239/265.17, 265.23

[56] References Cited
UNITED STATES PATENTS

| | | | |
|---|---|---|---|
| 2,657,532 | 11/1953 | Reid et al................. | 60/39.82 P X |
| 2,722,800 | 11/1955 | Jubb et al................... | 60/39.82 P X |
| 3,358,947 | 12/1967 | Bowyer et al................... | 244/73 R |
| 3,595,022 | 7/1971 | Radebold et al...................... | 60/258 |
| 3,614,026 | 10/1971 | Montanino et al............... | 244/3.22 |

*Primary Examiner*—Milton Buchler
*Assistant Examiner*—Barry L. Kelmachter
*Attorney, Agent, or Firm*—Rose & Edell

[57] ABSTRACT

An aerodynamic body of transonic design having a bluff base and in which base drag is reduced by burning fuel not only immediately behind the base but also in a secondary region further aft beyond the zone of stabilised recirculation. Fuel is injected, by main injectors disposed at or near the periphery of the body, into the boundary between the main air stream and the recirculating air stream and is ignited on approaching said secondary region by the flame from pilot burners located inward of the ring of main injectors.

5 Claims, 2 Drawing Figures

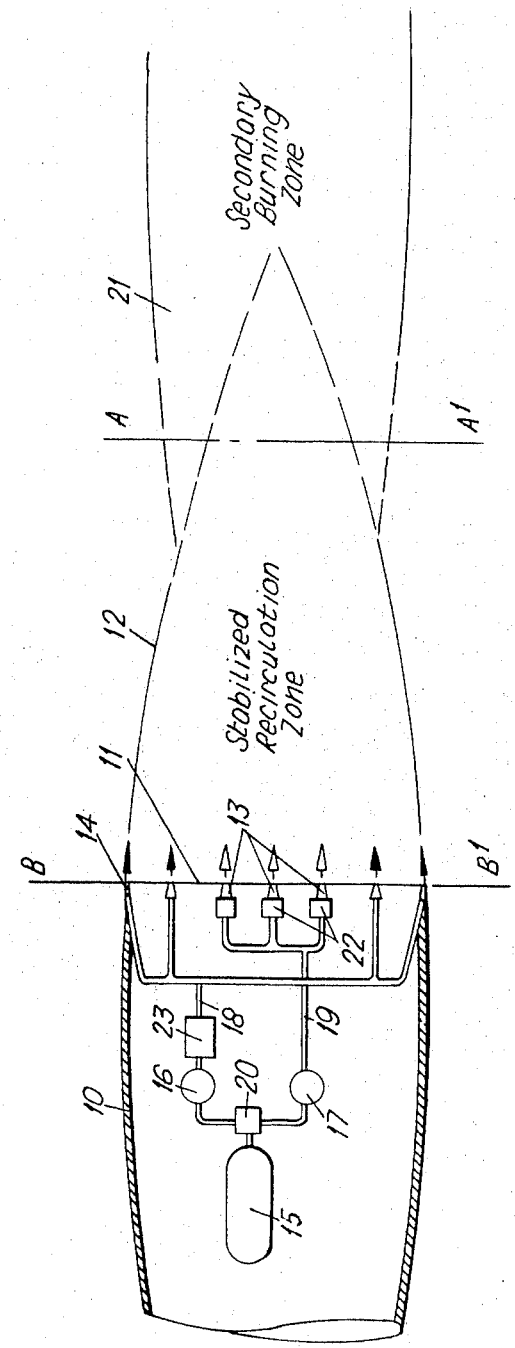

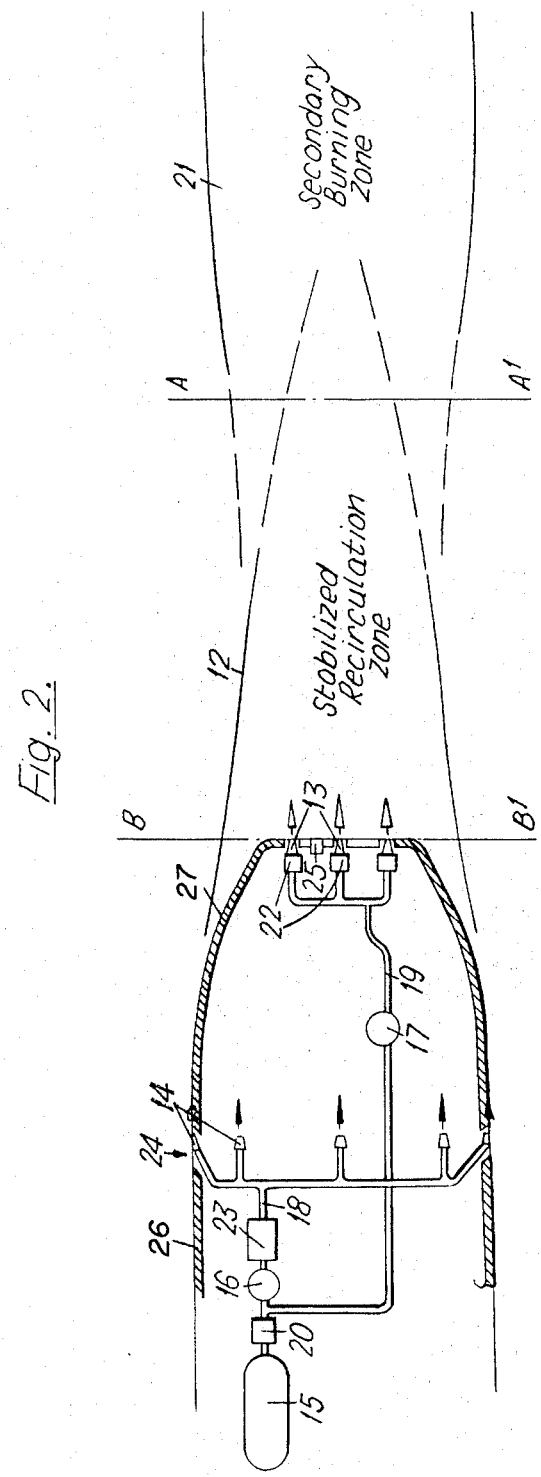

AIRCRAFT

This invention relates to aircraft and, more specifically, to reducing the drag of transonic aircraft.

It is known that that portion of the drag of an aircraft or missile body due to a bluff rear termination or a rear termination of high curvature, hereinafter called a 'bluff base', can be reduced by burning a suitable fuel in the region immediately behind the bluff base. The present invention is characterised in that the burning is arranged to occur some distance behind the bluff base (say 2 – 5 body diameters) as well as immediately behind the base.

This is based on the discovery that base drag relief can be achieved more economically by burning some distance behind instead of immediately at the base as hitherto; and the invention accordingly provides means for achieving burning in this more rearward region.

Ways of carrying the invention into practice will now be described by way of example with reference to the accompanying drawings, in which:

FIG. 1 is a diagrammatic longitudinal section illustrating one arrangement according to the invention, and FIG. 2 is a similar view illustrating a modified arrangement.

Referring to FIG. 1, behind a bluff base 11 of a fuselage 10, at all speeds but particularly at transonic speeds, is a region 12 of recirculating or reduced speed air flow, the shape of which, if the base cross section is circular, is very roughly that of a truncated cone. The pressure inside this region of recirculation 12, and therefore the pressure on the base area $BB^1$, is largely determined by the pressure in the external air flow at $AA^1$, i.e. at the rear end of the said truncated cone. Increase in pressure at $AA^1$ impedes the flow of gases from the recirculation region 12 into the main air stream, and therefore increases the pressure at $BB^1$ reducing the base drag.

It is proposed to effect this increase in pressure by burning fuel in and beyond the region of $AA^1$. It may not be practicable to confine the burning exclusively to the region $AA^1$ but the main benefit will come from the portion of the fuel that burns in this region. A system of fuel injection and ignition can be used comprising one or more pilot fuel injectors 13 lying within the base area $BB^1$ together with a further disposition of main fuel injectors 14 at or near the periphery of the base 11 or immediately ahead of it. There will also be a suitable ignition means 25 (FIG. 2) for the pilot fuel injectors within the base area. The fuel used can be liquid kerosene injected through atomisers or it may be pre-heated by mixing with hot engine gases or gaseous hydrocarbon.

In the arrangement shown in FIG. 1, the main and pilot fuel injectors 14, 13 are supplied from a common fuel source 15 by separate pumps 16, 17 and feed lines 18, 19. The feed lines have a common shut-off valve 20. Fuel to the pilot jets 13 is injected through atomisers 22, while the main fuel to the peripheral injectors 14 passes through a pre-heater 23.

The purpose of the fuel injection at the pilot burners 13 within the base area is to provide a stablising or pilot flame in the region of recirculation 12. The purpose of the peripheral fuel injection at the main jets 14 is to inject fuel into the boundary between the main air stream and the recirculating air stream so that it will begin to burn when, or shortly before, it reaches the region $AA^1$, thereby creating the secondary burning zone 21. The fuel injected around the periphery of the base $BB^1$ will flow back unburnt along the sides of the notional cone 12 and be ignited substantially in the region of $AA^1$ by the hot gases travelling rearwards from the pilot flame.

The description above concerns the utilisation of this invention when applied to a body with a circular or nearly circular base. There are similar recirculation regions of different shapes behind other shaped bases, and again the arrangement of fuel injectors to produce a stabilising flame in the recirculation region in combination with peripheral or near peripheral injectors to direct fuel to the boundary between the region of recirculation and the main stream will reduce drag with economical use of fuel.

FIG. 2 illustrates the technique applied to a fuselage 26 with a highly curved or ogival base 27. In this case the peripheral fuel injection does not take place at the extreme rear end $BB^1$ of the body but rather at the rearmost region 24 of maximum diameter, or where the main air stream first departs from the surface of the body and the recirculation zone 12 begins.

What I claim is:

1. A transonic aerodynamic body having a bluff base, immediately behind which air tends to recirculate in a region of generally truncated conical configuration surrounded by a main rearwardly-flowing air stream when said body is in motion, said body being characterized in that fuel burning is arranged to occur a distance on the order of two to five diameters of said body behind the bluff base as well as immediately behind said bluff base, said body comprising:

a ring of main fuel injectors for injecting fuel supplied thereto rearwardly of said bluff base, said ring having a thickness which is small relative to the diameter of the bluff base;

means for supplying fuel to said main fuel injectors;

pilot burner means disposed at said bluff base for igniting fuel injected by said main fuel injectors;

wherein said ring of main fuel injectors is disposed circumferentially about said pilot burner means and only at the periphery of said body such that fuel injected from said main fuel injectors flows unburned along the boundary of said region and is ignited at said distance on the order of two to five diameters of said body behind the bluff base.

2. A transonic body according to claim 1 wherein said pilot burner means comprises: pilot fuel injector means positioned to issue fuel supplied thereto rearwardly from the bluff base; means for supplying fuel to said pilot fuel injector means; and ignition means for igniting the fuel issued from said pilot fuel injector means;

and wherein said means for supplying fuel to said main fuel injectors and said means for supplying fuel to said pilot fuel injector means includes a common fuel source and two separate pumps to pump fuel to the main fuel injectors and to the pilot fuel injector means from the common fuel source.

3. A transonic body according to claim 1 wherein said pilot burner means comprises: pilot fuel injector means positioned to issue fuel supplied thereto rearwardly from the bluff base; means for supplying fuel to said pilot fuel injector means; ignition means for igniting the fuel issued from said pilot fuel injector means; and atomizer means for atomizing the fuel supplied to said pilot fuel injector means.

4. A transonic body according to claim 1 further comprising a preheater to preheat the fuel supplied to the main fuel injectors.

5. A transonic body according to claim 1 wherein said body has a substantially ogival base and the main fuel injectors are disposed at the portion of the body periphery at which air flow past said body first departs from the surface of said body and region of air recirculation begins.

* * * * *

UNITED STATES PATENT OFFICE
CERTIFICATE OF CORRECTION

Patent No. 3,820,745          Dated June 28, 1974

Inventor(s) Robert Hugh Francis, deceased

It is certified that error appears in the above-identified patent and that said Letters Patent are hereby corrected as shown below:

Page 1, insert the following:

Assignee: Hawker Siddeley Aviation, Limited,
           Surrey, England

Signed and sealed this 26th day of November 1974.

(SEAL)
Attest:

McCOY M. GIBSON JR.        C. MARSHALL DANN
Attesting Officer           Commissioner of Patents